Jan. 10, 1950      H. P. SPARKES      2,494,269
SAFETY DEVICE FOR VEHICLE BRAKES
Filed Oct. 1, 1946
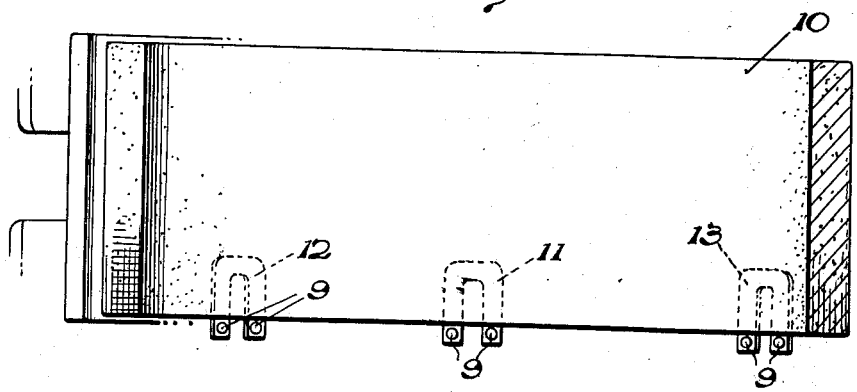
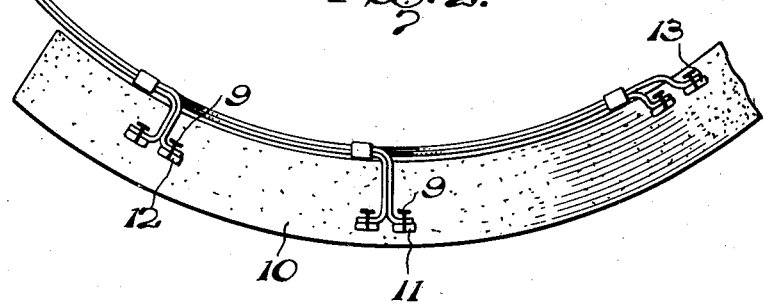
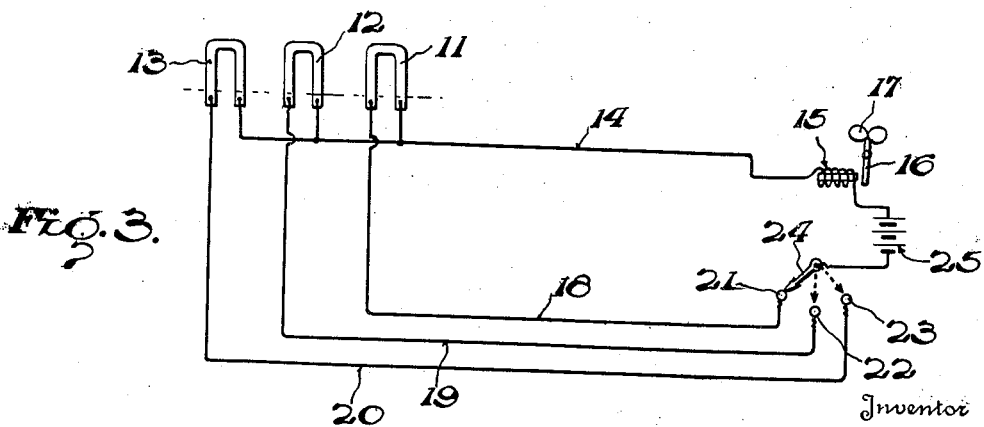
Inventor
Harry P. Sparkes
By Cameron, Kerkam + Sutton
Attorney Patented Jan. 10, 1950

2,494,269

UNITED STATES PATENT OFFICE 2,494,269

SAFETY DEVICE FOR VEHICLE BRAKES

Harry P. Sparkes, West Orange, N. J., assignor to Spar-Holl Manufacturing Company, Incorporated, Glassport, Pa., a corporation of Pennsylvania Application October 1, 1946, Serial No. 700,470

2 Claims. (Cl. 177—311)

This invention relates to safety devices for relatively heavy road vehicles, as distinguished from railroad vehicles, for example busses and trucks, and more particularly to means for indicating when the brakes of such relatively heavy road vehicles have attained a predetermined temperature above which is considered unsafe for the brakes.

Many accidents occur annually because, particularly in the case of vehicles hauling heavy loads, the vehicle brakes, while the vehicle is descending long or steep grades, or sometimes because of unskillful application, become so badly overheated that, before their dangerous condition is realized, they are no longer capable of stopping the vehicle. I am aware that various systems have heretofore been proposed for use on railroad vehicles to give warning or take automatic action when a hot box develops, but systems of this character are unduly complicated for general use on road vehicles. I am also aware that various proposals have heretofore been made to provide road vehicles with signalling systems to indicate when the brake bands have become unduly worn, to show by signalling means when the brakes on the different wheels of the vehicle are or are not approximately equalized, etc., but again devices of this character as heretofore proposed have either been unduly complicated or otherwise have been unsuitable for one reason or another for practical use in giving warning to the driver, who is ordinarily not interested in the temperature of his brakes so long as a dangerous condition is not being approached, that his brakes are becoming unduly heated.

It is an object of this invention to provide a safety device for relatively heavy road vehicles which is of such character that without undue expense or complication it can be readily incorporated in the braking systems of such vehicles to afford a certain indication when one or more of the brakes is becoming unduly heated.

Another object of this invention is to provide a device of the type just characterized which may be so constructed as to function with equal certainty during succeeding stages of wear of the brakes.

Another object of this invention is to provide a device of the type characterized which may also provide an indication of the extent of wear of the brake bands.

Another object of this invention is to provide a device of the type characterized which is composed of simple parts that may be manufactured and installed at low expense so that systems embodying the present invention may be readily applied to a wide variety of vehicles, and meet the needs of standardized practice, while operating with efficiency and certainty to afford the desired information to the vehicle driver.

Other objects of this invention will appear as the description of the invention proceeds.

The invention is capable of receiving a variety of mechanical expressions one of which has been illustrated on the accompanying drawing, but it is to be expressly understood that the drawing is for purposes of illustration only, and is not to be construed as a definition of the limits of the invention, reference being had to the appended claims for that purpose.

Referring in detail to the accompanying drawing, wherein like reference characters are used to designate corresponding parts in the several figures, Fig. 1 is a diagrammatic plan of a section of a brake band embodying the present invention;

Fig. 2 is an end view of the section shown in Fig. 1; and

Fig. 3 is a schematic wiring diagram showing one form that the electrical system may take.

In conformity with the present invention a brake band or block, hereinafter referred to generically as a brake band, and which may be of any suitable construction and material, has molded into, or otherwise permanently embedded in, the band as originally manufactured one or more thermoresponsive elements which, at a predetermined temperature, will cause a flow of electric current through an electrical system to any appropriate signalling device or indicator to warn the driver that a dangerous temperature has been reached. While as respects the broader aspects of the present invention only a single thermoresponsive element may be associated with each brake band, I prefer, for reasons to be explained, to associate a plurality of thermoresponsive elements with each brake band, said elements being at different distances from the braking face of the band so that the capacity of the signalling provision to indicate a dangerous condition will not be terminated because of the wear on the band, within limits commonly encountered before replacement is deemed necessary, if a thermoresponsive element is placed near the face of the band so as to be more promptly responsive to drum temperature.

Coming now to the embodiment shown on the drawing, 10 designates a section of a brake band of any suitable material and construction such as is appropriate for use with the usual brake drum of a relatively heavy road vehicle. Molded into or otherwise permanently embedded in said brake band, but so as to be readily accessible from the exterior for the making of electrical connections therewith, is at least one, and preferably a plurality of thermoresponsive elements diagrammatically indicated at 11, 12 and 13 having terminal posts 9. Said elements may be of any suitable character and construction so as to become operative at a predetermined temperature, as hereinafter explained, to generate or pass a predetermined current. For example they may take the form of suitable resistance elements, suitably insulated from the material of the brake band, which upon attainment of the predetermined temperature will permit a predetermined current to flow therethrough, as well understood in the art, or they may take the form of thermocouples composed of suitable metals so that, as understood in the art, when a predetermined temperature has been reached a predetermined thermoelectric current will be generated, or they may take the form of reactors in suitable Wheatstone bridge circuits so as to upset the balance therein when the predetermined temperature is reached, etc.

Said thermoresponsive elements may extend from the edge of the brake band to any desired depth into the material of the band, but as their purpose is to indicate the temperature of the brake drum the extent to which said elements penetrate the brake band in a direction parallel to the drum is not of critical importance. As illustrated in Fig. 2, said thermoresponsive elements, when a plurality are used, are disposed at different distances from the braking face of the drum. Thus assuming an internal brake band, the element 11 may be disposed near the braking face of the band, the element 12 may be disposed midway of its depth and the element 13 may be disposed sufficiently deep within the brake band material so that it will remain for operation even though the brake band is worn to the maximum extent considered permissible. While three elements have been illustrated at different depths in the brake band material it is to be expressly understood that any suitable number may be used depending upon the number of possible sources of indication desired.

Referring now to the schematic wiring diagram of Fig. 3 to illustrate one of several ways in which the current from the thermoresponsive elements may be utilized to give a desired signal, the several thermoresponsive elements 11, 12 and 13 are shown as connected into any suitable circuit so that when the predetermined temperature selected as dangerous temperature has been reached signalling means of any suitable character and construction will indicate that fact. As shown, each of said elements is connected at one end in series by a common lead 14 to any suitable indicator, such as a solenoid or electromagnetic coil 15 whose armature 16 is operatively connected to a suitable indicating means, for example a plate 17 which may be movable before a sight opening in an indicator casing so that in one position a color such as red denotes danger while in another position a color such as white denotes safety. The opposite ends of the elements 11, 12 and 13 are respectively connected through leads 18, 19 and 20 to corresponding switch points 21, 22 and 23 associated with a manually operable switch arm 24. The circuit may be completed through any suitable battery 25 such as the usual ignition battery of the vehicle. When the arm 24 is moved to any one of the contacts 21, 22, 23 the corresponding temperature responsive elements 11, 12, 13 are respectively brought into circuit with the indicator 15—17 as will be apparent to those skilled in the art.

Assuming that the brake is new, contact arm 24 will be placed on contact point 21 so as to place the thermoresponsive element 11 in circuit with the indicator 15—17. In service, as long as the brake is not dangerously hot, the indicating disk 17 will be held in any suitable way, as by spring action, so as to dispose its safety portion, above assumed to be white, before the sight opening of the indicator. If, because of repeated or unskillful appplications of the brake the brake becomes unduly hot, thermoresponsive element 11, which is disposed sufficiently close to the braking surface of the band so as to be responsive to the temperature of the brake drum, will generate or pass sufficient current to the coil 15 so as to actuate the indicator disk 17 and move the same over into a position wherein its portion indicating danger, above assumed as red, will be before the sight opening of the indicator. Thereby the driver of the vehicle will at once be warned that his brake is overheated and the vehicle should be stopped before braking capacity has been lost. If preferred, an audible signal may be used in place of or as a supplement of the visible signal, or any other suitable form of visible signal may be used.

As the brake band wears the thermoresponsive element 11 will be short circuited by contact with the brake drum, which will promptly actuate the indicator 15—17 and warn the driver to move the switch arm 24 to contact point 22, thereby bringing the thermoresponsive element 12 into circuit with the indicator. Thereafter the safety device will continue to function as heretofore described by action from element 12. Short circuiting of the thermoresponsive element 12 will again warn the driver to move the switch arm to contact point 23, thereby bringing the thermoresponsive element 13 into circuit with the indicator for like operation.

The foregoing short circuiting of the thermoresponsive elements has the further advantage that it also affords information to the driver as to the extent to which his brakes are worn. Thus if the element 11 is disposed at a quarter of the depth of the band and it becomes necessary to bring the thermoresponsive element 12 into circuit with the indicator because the element 11 has been short circuited or destroyed, this is an indication that the brake band is one quarter worn through. If the thermoresponsive element 12 is half way of the thickness of the band short circuiting or destruction thereof shows that the band is half worn through. Thermoresponsive element 13 may be disposed at such a depth that if this element is also short circuited or destroyed it is notice to the driver that it is unsafe to continue until his brakes are replaced.

While in explaining the invention so far only a single brake band has been assumed, it will now at once be apparent that the invention can be applied to all the brake bands of a vehicle and the corresponding temperature responsive elements of the several bands may be connected in parallel for several actuations of the indicator so that the driver is at once warned if any brake on his vehicle becomes unduly hot. On the other hand, if such information is deemed desirable, it is apparent that the thermoresponsive elements associated with the respective brake bands may be separately connected to separate indicators so that the driver will not only know that one of his brakes has become unduly heated but also know which one has become unduly heated.

While as above suggested the warning device of the present invention may be so constructed as to come into action only when a predetermined temperature approaching a condition of danger has been reached, it is apparent that if desired the system may be so constructed that the indicator shows a range of temperature, the resistance coils, thermo couples, etc., functioning to pass or generate a current proportional to the varying temperature at the brakes so that by use of an appropriate indicator the driver may see at any moment the relative temperature existing at the brake. For example, the indicating instrument may be a small millivoltmeter with its scale calibrated to indicate a range of temperature which may start at any desired temperature and extend to include the highest temperature likely to be encountered, in which event a part of the dial starting at that temperature at which the driver should be warned may be given a differentiating color, as red, so that when the pointer approaches or reaches such red section of the dial he will know that his brake is getting too hot without dependence on his knowledge as to what is a safe temperature.

It will therefore be perceived that by means of the present invention a safety device has been provided which is of such simplicity that it can be readily incorporated in any brake band of a relatively heavy vehicle at small additional expense so as to provide an always-available warning whenever any brake of the vehicle has become overheated, and thereby showing the driver that if he continues he may lose his braking capacity. The device is composed of such simple parts that they may be easily manufactured, installed and serviced, and the system is of such simplicity and low cost that standardized adoption as a means for reducing accidents is greatly facilitated.

While the embodiment of the invention illustrated on the drawing has been described with considerable particularity it is to be expressly understood that the invention is not to be limited thereto as the same is capable of receiving a variety of expressions as will now be apparent to those skilled in the art, while changes may be made in the details of the component parts, such as the temperature responsive elements, the form of the wiring system, the character of the indicating mechanism, etc., without departing from the spirit of this invention. Reference is therefore to be had to the appended claims for a definition of said invention.

What is claimed is:

1. In a safety device for relatively heavy road vehicles, in combination with a brake band thereof, means for warning the driver that the brake has attained a predetermined temperature which includes at least two temperature responsive elements permanently embedded in the material of said brake band at different distances from the braking face thereof and each having provision for making electrical connection with an electrical circuit at the exterior of said band, a single electrical circuit connected to said elements and including switching means for severally connecting said elements into said circuit, each of said temperature responsive elements being constructed to cause a predetermined electrical current to flow in said circuit when said element attains a predetermined temperature, and an indicator in said circuit operable by said predetermined current to signal the presence of said predetermined temperature at the brake.

2. In a safety device for relatively heavy road vehicles, in combination with a brake band thereof, means for warning the driver that the brake has attained a predetermined temperature which includes a plurality of temperature responsive elements permanently embedded in the material of said brake band at different distances from the braking face thereof and each having provision for making electrical connection with an electrical circuit at the exterior of said band, single electrical circuit connected to said elements and including switching means for severally connecting said elements into said circuit, each of said temperature responsive elements being constructed to cause a predetermined electrical current to flow in said circuit when said element attains a predetermined temperature, and an indicator in said circuit operable by said predetermined current to signal the presence of said predetermined temperature at the brake, said temperature responsive elements being also constructed to be short circuited by contact with a brake drum to actuate said indicator and show that another element should be placed into circuit with said indicator.

HARRY P. SPARKES.

REFERENCES CITED

The following references are of record in the file of this patent:

UNITED STATES PATENTS

| Number | Name | Date |
|---|---|---|
| 1,957,051 | Norton | May 1, 1934 |
| 2,015,731 | Roth | Oct. 1, 1935 |
| 2,087,386 | Norton | July 20, 1937 |
| 2,182,554 | Galle | Dec. 5, 1939 |